Patented Mar. 12, 1935

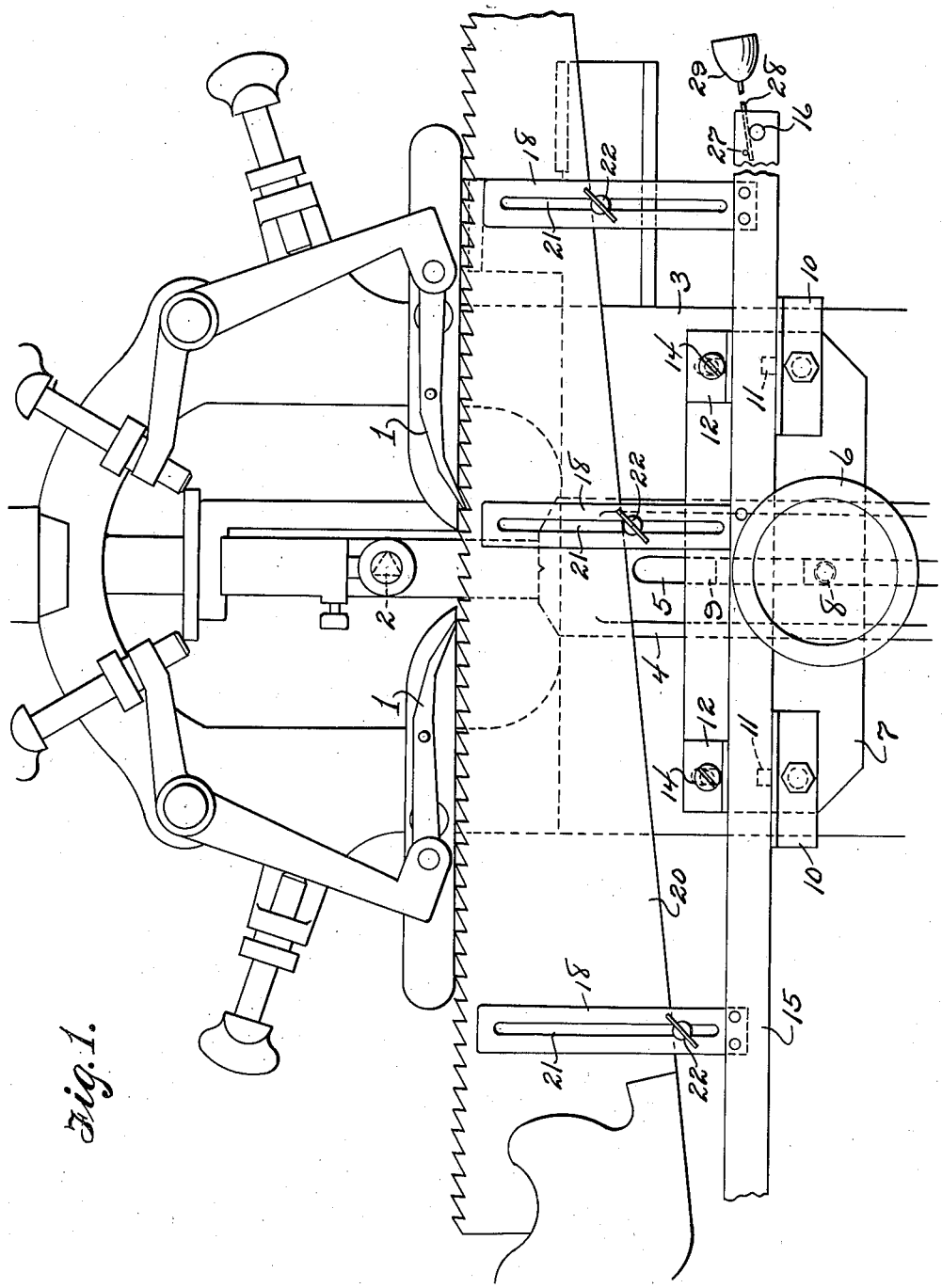

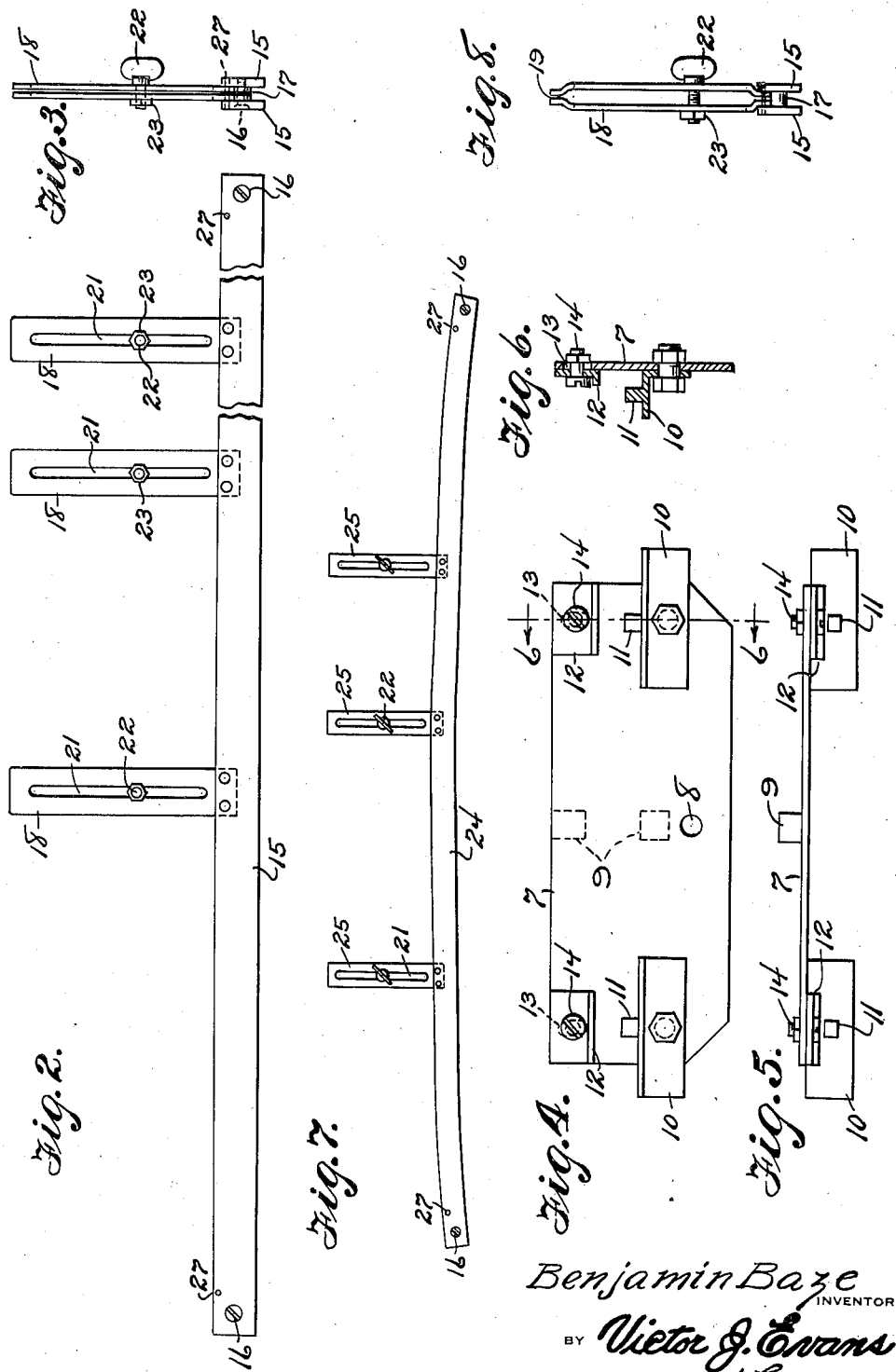

1,994,332

UNITED STATES PATENT OFFICE 1,994,332

ATTACHMENT FOR SAW FILING MACHINES

Benjamin Baze, Port Huron, Mich.

Application August 30, 1933, Serial No. 687,499

3 Claims. (Cl. 76—35)

My present invention has reference to a carriage attachment for saw filing machines, and among the objects of the invention is the provision of a saw carriage for this purpose which will obviate the binding of the saw in its movement, which provides the machine with greater saw handle clearance than is ordinary, which eliminates special attachment for filing keyhole and compass saws, which permits of the filing of the end teeth of the saws, and permits of the saw being filed in a more expeditious and more accurate manner than is ordinary, and which is reversible so that the saw can be filed on both of its sides.

To the attainment of the foregoing the invention consists in the improvement hereinafter described and definitely claimed.

In the drawings:

Figure 1 is a side elevation of the improvement.

Figure 2 is a plan view of the carriage.

Figure 3 is an end view thereof.

Figure 4 is a plan view of the carriage support and guide.

Figure 5 is a top plan view thereof.

Figure 6 is a sectional view approximately on the line 6—6 of Figure 4.

Figure 7 is a side elevation of a carriage employed when a bowed saw is to be filed.

Figure 8 is an end view thereof.

My improvement is designed to be removably and reversibly attached to saw filing machines. Dogs or pawls engage with the teeth of the saw and are actuated for advancing the saw step by step for the filing of the several teeth thereof. Such devices are old in the art and certain of which form the subject matter of U. S. Letters Patent 1,666,087 and 1,224,293.

In Figure 1 of the drawings a portion of saw filing machine is illustrated to show the application of my improvement thereon. The machine shown in the drawings is provided with the feed dogs 1 for advancing the saw in both directions so that the teeth of the same can be operated upon by the file 2. The body of the machine is indicated by the numeral 3 and the jaw by the numeral 4, the said jaw being provided with a central arranged vertically disposed slot 5 through which passes the bolt or threaded element that is received by the threaded bore of the hand wheel 6. My improvement comprises essentially a carriage guide, which is in the nature of a plate 7. This plate is provided with a central opening 8 located adjacent to its bottom edge and through which the screw or bolt element engaged by the hand wheel 6 passes. The plate is further provided on its inner face with lugs 9 to be received in the slot 5 of the jaw 4 and by this structure, it will be apparent that the plate is adjustable vertically and held in adjusted position by the hand wheel. The plate 7, adjacent to its ends, and likewise at points adjacent to its lower edge has secured thereon angle or ledge strips 10, the horizontal flanges of the said strips being arranged at the upper edges thereof and on these flanges there are centrally formed short lugs or pins 11 which are square in cross section. Above the angle strips 10 there are other and shorter angle strips 12, the horizontal flanges of which being arranged on the lower edges and through these metal strips and through the elongated slots 13 in the plates 7 there are passed bolts 14 which are engaged by nuts so that the strips 12 are mounted for vertical movement for cooperation with the strips 10 and together therewith act as clamping brackets for the rail of the carriage which will be presently described.

The carriage includes a rail of a determined length. The rail is made up of two spaced plates or strips 15 which are held together and in proper spaced relation by screws or bolts 16 that pass through the bores of rollers 17 whose ends contact with the confronting faces of the plates 15.

Secured by rivets or like elements between the confronting faces of the plates 15 that constitute the rail there are the inner ends of upwardly directed cooperating pairs of clamps 18. Each of the clamps is in the nature of a metal plate which embodies a natural resiliency and the opposite ends of the plates or strips constituting the clamps are bent inwardly, the lower portions being received between the rail members 15 of the carriage and the upper inwardly directed ends 19 provide jaws that are designed for clamping engagement with the saw blade 20. Each of the cooperating pairs of clamps 18 is provided with central elongated and registering openings 21 and these openings extend almost the length of the body portions of the clamps and have passed therethrough the shanks of headed bolts 22 which are engaged by nuts 23.

The clamps need not have their ends bent toward each other as the screwing home of the bolts through the nuts will force the plates constituting the clamps toward each other to effectively bind the saw blade therebetween, but in Figure 8 of the drawings I have shown the said clamps provided with the jaws 19.

The rail of the carriage is received by the horizontal flanges of the angle strips 10 and the pins or lugs 11 are received in the slot or rather space between the plates 15 constituting the rail. The horizontal flanges of the angle strips or brackets 12 are brought over the upper edge of the rail but not with sufficient friction as to prevent the free sliding of the rail between the horizontal flanges of the strips 10 and 12. The bolts 22 are adjusted in the slots of the clamps so that the lower non-toothed and angle edge of a hand saw, such as is disclosed by Figure 1 of the drawings, will rest on the said bolts when the blade of the saw is tightly secured between the clamps, and whereby the upper and toothed edge of the saw will be arranged in a horizontal plane or in a position to permit of the teeth being properly engaged by the dogs 1 and the said teeth sharpened by the file 2.

Saw blades of any character, width and lengths, and also thickness may be effectively engaged by the clamps of the carriage and the carriage will freely slide between the horizontal flanges of the angle strips 10 and 12 of the guide plate 7. By adjusting the guide plate 7 the toothed edge of the saw will be arranged in proper position to be engaged by the feed dogs 1 and to be operated upon by the file 2. It is merely necessary to release the bolts 14 and to elevate the angle strips or clamping brackets 12, to permit of the carriage being reversely arranged upon the guide plate 7. This is an important feature of the invention as the same permits of the saw being filed from both sides and also in view of the fact that it is easier to file the saw with the grain or set. This is impossible with hand saw carriages of any type with which I am acquainted, as in such carriages the saw must be removed therefrom in the reversal thereof, while in the majority of instances one-half of the saw must be filed against the grain or set which leaves a feather edge on one side of the saw with the result that the saw will not cut as clean and true as when filed from both sides. Also with my improvement the manner of filing the teeth with the grain or set thereof will prolong the life of the file, and likewise the saw can be filed in a better and more accurate manner and with a less expenditure of time than with the old and well known methods.

In Figure 7 I have illustrated a slightly modified form of carriage and the rail 24 thereof is of a similar construction to that previously described, except that the plates constituting the rail 24 are bowed. The rail 24 has secured thereon clamps 25 similar to those previously described and it travels between the flanges of the angle strips 10 and 12 of the carriage guide 7 in the same manner as previously set forth but because of its bowed construction the carriage will hold the teeth of the bowed saw in proper position to be operated on by the file and to be advanced by the dogs. In order that the carriage will hold the saw for proper engagement for filing the first and last few teeth thereof, there is arranged on both the rails 15 and 24 inwardly and above the end rollers 17, transverse pins 27, and between the pins and rollers I insert a stem 28 projecting from a weight 29. The weight is to be arranged at either end of the carriage in order to swing the opposite end thereof upwardly to saw filing position and the weight is removed when the remaining teeth of the saw are operated upon by the file.

It is believed that the foregoing description, when read in connection with the accompanying drawings, will fully and clearly set forth my construction and the advantages thereof so that further detailed description will not be required. Obviously I do not wish to be restricted to the specific construction herein shown and described and, therefore, hold myself entitled to make such changes therefrom as fairly fall within the scope of what I claim.

Having described the invention, I claim:

1. An attachment for saw filing machines and comprising a plate adapted to be adjustably and removably secured to a saw filing machine, angle strips secured to the plate and including horizontal flanges, upstanding pins secured to the flanges, clamping brackets adjustable on the plate for cooperation with the flanges to provide guides, a carriage capable of reversible association with the plate and including spaced parallel connected rail members mounted for slidable movement in the guides with the pins disposed between the spaced members, pairs of upstanding slotted members secured to the spaced members and providing saw clamps, and binding elements passing through the slots of the upstanding members for forcing the saw clamps against a saw blade and to provide rests for the lower and non-toothed edge of the blade.

2. An attachment for saw filing machines and comprising a plate adapted to be adjustably and removably secured to a saw filing machine, angle strips secured to the plate and including horizontal flanges, pins secured to and rising from the flanges, clamping brackets adjustably mounted on the plate above the flanges for cooperation therewith to provide guides, a carriage capable of reversible association with the plate and including spaced parallel connected rail members mounted for slidable movement in the guides with the pins disposed between the spaced members, slotted upstanding members secured to the spaced members and arranged in cooperating pairs to provide saw clamps, binding elements passing through the slots of the members for forcing the latter against a saw blade and to provide rests for the lower and non-toothed edge of the blade and a removable weighted element designed to engage with either of the ends of the rail.

3. An attachment for a saw filing machine the latter having a vertically disposed longitudinally slotted clamping jaw, a screw bolt passing through the slot of the jaw, a hand wheel received by the screw bolt, and said attachment comprising a plate, lugs on said plate to be received in the slot of the jaw, said plate having an opening therein to receive the screw bolt therethrough to permit the plate to be clamped to the jaw by the hand wheel, pin carrying angle members on the plate, vertically adjustable clamping members on the plate and cooperating with the angle members to provide guiding means, a saw carriage including a hollow rail mounted for slidable movement in the guiding means, and upstanding pairs of cooperating slotted members secured to the rails to provide saw clamps, bolts engaged by nuts passing through the slots of the upstanding members for forcing the latter toward each other and for likewise affording a support for the non-toother edge of a saw blade when the said blade is received in the clamps.

BENJAMIN BAZE.